UNITED STATES PATENT OFFICE.

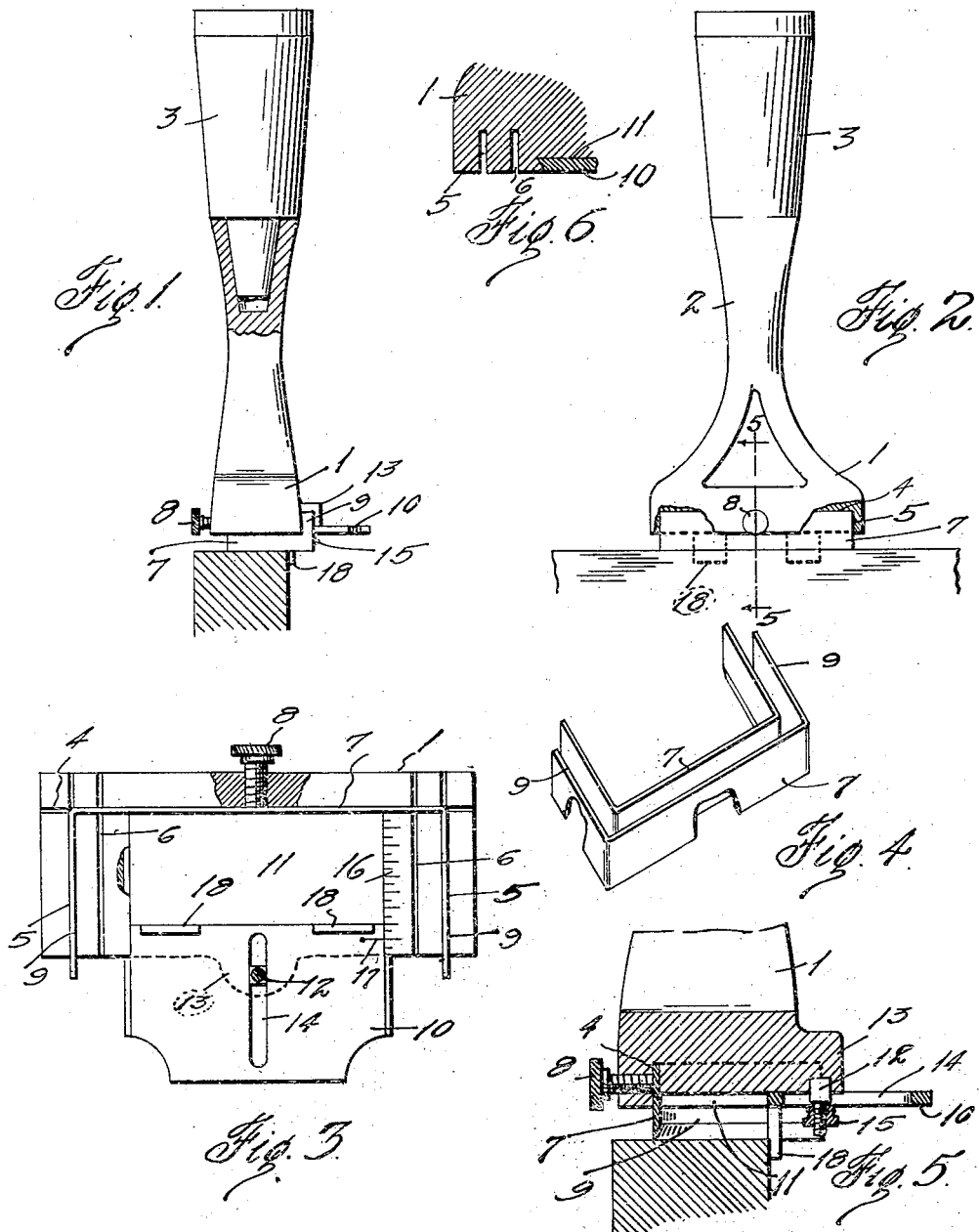

GEORGE R. PUMMILL, OF CORSICANA, TEXAS.

HINGE GAGE AND MARKING TOOL.

1,251,693. Specification of Letters Patent. Patented Jan. 1, 1918.

Application filed April 25, 1916. Serial No. 93,358.

*To all whom it may concern:*

Be it known that I, GEORGE R. PUMMILL, citizen of the United States, residing at Corsicana, in the county of Navarre and State of Texas, have invented certain new and useful Improvements in Hinge Gages and Marking Tools, of which the following is a specification.

This invention pertains to new and useful improvements in hinge gages and markers.

In mortising out a door to receive a hinge it is quite difficult to get the mortise exactly correct in width and depth as it is the common practice to lay the hinge on the door and mark around the same. While devices have been produced for cutting and marking these mortises they do not seem to have come into general use.

In carrying out my invention I provide a tool having interchangeable cutters arranged to be fastened in the head of the tool, only one cutter being used at a time. The cutters are dimensioned so as to cut or mark three sides of the mortise of the desired size. A gage plate is also mounted on the head of the tool and may be set to give the desired width to the mortise.

Other features of the invention will be apparent from a perusal of the following specification and the invention will be more readily understood by reference to the accompanying drawings in which an example of the invention is shown and wherein:

Figure 1 is an end elevation of the tool, a portion of the handle being shown in section, Fig. 2 is a side elevation, Fig. 3 is an under side view, Fig. 4 is a detail of a pair of the cutters, Fig. 5 is a transverse sectional view on the line 5—5 of Fig. 2, and Fig. 6 is a sectional detail of the head and cutter slots.

In the drawings the numeral 1 designates a head which is provided with a shank 2, the latter being formed to receive a handle 3. The under side of the head is substantially rectangular in plan and is provided near one side with a longitudinal groove 4 which is intersected at each end by transverse grooves 5 and 6 respectively extending across the face of the head at right angles to the groove 4.

A plurality of angular cutters 7 of different lengths are provided. In the drawings I have shown only two cutters and only two sets of cross grooves 5 and 6, but it is to be understood that additional grooves and cutters may be employed. The length of each cutter is determined by the length mortise it is to cut. In the drawings a cutter is shown in the grooves 5 and the groove 4. If it is desired to cut a shorter mortise the cutter is removed and one selected which will fit in the grooves 6. The free ends of the cutter project from the side of the head and the cutter is held in the grooves by a friction screw 8 mounted in the head and engaging the cutter in the groove 4.

The cutters each have legs 9 at each end and will mark three sides of the mortise. In order to gage the width of the mortise a gage plate 10 is slidably confined in a recess 11 in the face of the head. This plate has a central slot 14 transverse of the head, which slot receives the squared portion of a stud 12 embedded in a boss 13 projecting from the side of the head. The lower portion of the stud is screw threaded and receives a thumb-nut 15 which bears on the plate 10 and fastens the same in position. A scale 16 is provided on the face of the head and an index 17 is marked on the plate, by means of which the distance of the inner edge of the plate from the groove 4 can be readily determined.

A pair of lugs 18 is provided co-incident with the inner edge of the plate and depend below the face of the head 1 so as to engage the side or edge of the door when the tool is in use. The lower edge of the cutter is beveled so as to produce a knife-edge and each is made sufficiently stout to withstand battering.

In using the tool the cutter is first selected. For instance if it is desired to cut mortises or seats for a three inch hinge the cutter 7 of the proper length would be picked out and inserted in the grooves 4 and 5. If the hinge is two and one-half inches long a shorter cutter would be used and placed in the grooves 4 and 6. These measurements are merely illustrations.

The next step is to set the plate 10 and it is adjusted by bringing its index 17 opposite the proper point on the scale 16 to give a distance between the cutter 7 and the lugs 18 equal to the width of the hinge. The tool is now placed on the door at the point where it is desired to cut the mortise, the lugs 18 bearing against the side of the door as shown in Fig. 4. By striking the handle a sharp blow the cutter will be sunk into the wood thus marking and partially or entirely cut the mortise on three sides. The wood from the mortise may be removed by a chisel and the hinge fastened in place. If it is desired the plate 10 may be moved inward and used to gage the thickness of the hinge leaf, the tool being placed on the side of the door with the lugs against the edge.

It is obvious that a mortise can be quickly and accurately outlined with this tool and as the hanging of the door depends largely upon the setting of the hinges, a higher class of work can be had.

What I claim, is:

1. A hinge gage and marking tool comprising a rectangular heading a single longitudinal groove in its under surface and a plurality of parallel transverse grooves at each end of the head intersecting the longitudinal groove at right angles thereto, U-shaped cutters all fitting in the single longitudinal groove and each cutter having its ends fitting in a pair of transverse grooves, the cutters being of different lengths and the transverse grooves being spaced apart, means for fastening the cutters in the longitudinal groove, and a gage on the head for limiting the width of the mortise outlined by the cutters.

2. A head for hinge gages and marking tools having a single longitudinal groove in its under surface near one longitudinal edge and a plurality of parallel transverse grooves adjacent each transverse edge of the head and intersecting the longitudinal groove, and said head also having a gage receiving portion inclosed by the longitudinal and transverse grooves.

In testimony whereof I affix my signature.

GEORGE R. PUMMILL.

Copies of this patent may be obtained for five cents each, by addressing the "Commissioner of Patents, Washington, D. C."